Patented Oct. 11, 1927.

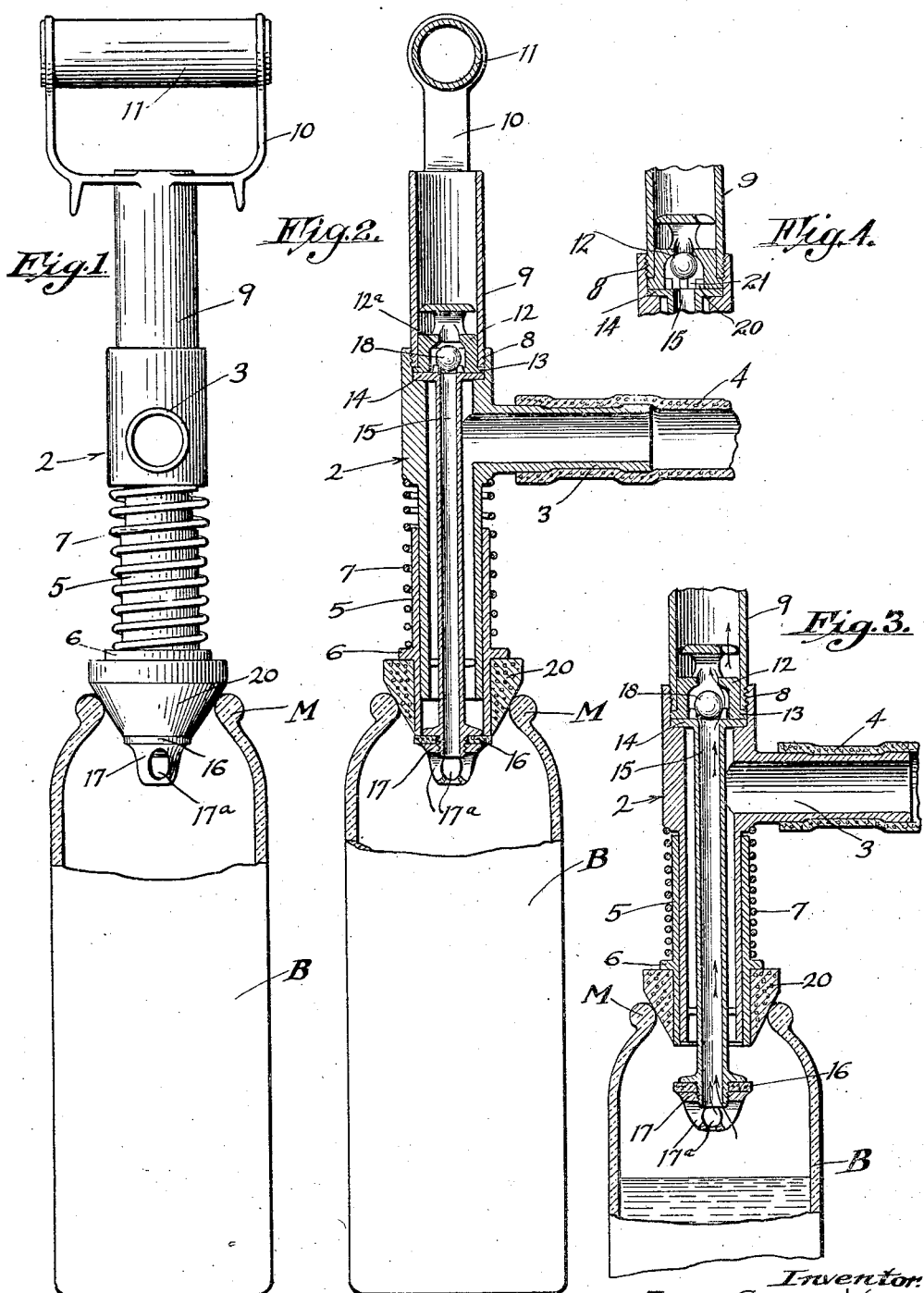

1,645,034

UNITED STATES PATENT OFFICE.

FRANK CHARLES WOLF, OF LOS ANGELES, CALIFORNIA.

MILK-BOTTLE FILLER.

Application filed May 5, 1922. Serial No. 558,623.

This invention relates to bottle filling means.

The invention has for an object to provide for the rapid filling of various types of receptacles and is shown in the present case as designed for the filling of milk bottles.

It is another object of the invention to provide a device which will enable the rapid filling or charging of receptacles with a liquid and which provides for the venting of the receptacle while it is being filled.

Again, an object is to provide means for concurrently opening a valve when the device is applied to a bottle mouth so that liquid can flow continuously through the device into the bottle, and which device will provide for the displacement of the air.

In my milk bottle filler I incorporate a valve cage with a float valve in an air-vent pipe which is enclosed in a shell through which milk may be conducted to the bottle. This cage is secured to the upper end of the shell, being held in place by a vent tube or sleeve to which the handle is directly attached. A shoulder formed in the shell holds both the air-vent pipe and the valve cage in position. When the bottle is filled the milk flows up the air vent tube, floats the valve in the valve cage on the upper end of this tube and thereby prevents any more milk from flowing into the bottle.

When the handle is raised the valve at the lower end of the nozzle member, due to the telescopic arrangement, closes the nozzle and shuts off the milk from the source of supply, so that the filler may be transferred from bottle to bottle. However, in lifting the filler the milk in the air-vent tube, between its lower end and the float valve, will flow downwardly into the bottle and hence fill the bottle to the brim by flowing a sufficient quantity of milk to fill the space occupied or displaced by the lower end of the filling nozzle and the valve to close such nozzle.

An embodiment of the invention is described in the following specification and illustrated in the accompanying drawings, in which Fig. 1 is a side elevation of the device as applied to a bottle, a portion of which is in section.

Fig. 2 is a longitudinal section through the device showing it in closed position upon the bottle mouth.

Fig. 3 is a sectional view showing the valve in open position and indicating the escape of air while the bottle is filling.

Fig. 4 is a sectional view of the valve similar to Fig. 3, with the valve closed stopping the flow of milk.

The invention is embodied in a form of device designed to be constantly in flexibly connected relation to a source of supply of liquid such, for instance, as milk, and the device is adapted to be quickly shifted from one bottle or other receptacle to another to enable the rapid filling of the bottles from the source of supply. A purpose of the invention is to provide means for eliminating waste and at the same time to secure sanitary service and operation.

Means are also provided for automatically cutting off the outflow through the air vent in case that the filling "nozzle", as it may be termed, is not closed off at the proper instant and thus obviates the spilling of the liquid.

The nozzle or filling device consists of an elbow like shell 2, one branch 3 of which is designed to be fitted to a supply source as by means of a flexible tube 4 connected to the reservoir containing the liquid with which receptacles are to be charged. The lower end of the shell 2 is shown as turned down and slidably receives a nozzle member 5 having an annular outer shoulder 6 against which bears downwardly a spring 7, the upper end of which seats on a shoulder of the shell 2. The upper end of the shell is internally threaded at 8 to receive a sleeve or vent tube 9 to the upper end of which may be suitably secured a handle yoke 10 provided with a transverse handle bar 11.

The vent tube 9 encloses a bushing 12 having an outturned flange 13 in the end of the shell 2 and bearing upon a flange 14 provided on the upper end of an inner air pipe 15 which is secured in place by the bushing 12 and the tube 9. The pipe 15 is spaced within the bore of the shell 2 and extends below the lower end thereof and carries a valve forming disc or washer 16 which is clamped in place by a head 17 screwed on the end of the pipe 15. The head 17 is shown as provided with a plurality of apertures 17$^a$ which permit the escape of air upwardly through the pipe 15 and out through the tube 9. On the upper end of the pipe 15 is placed a valve ball 18, which is designed to rise and bear upon a seat 12ª provided therefor in the bushing or valve seat member 12.

The ball 18 is of such weight that it will not be lifted by the air flowing upwardly but will be floated on the liquid rising in the pipe 15.

Surrounding the lower end of the shell 2 is a cushion member 20 of soft or yieldable material such as rubber, and this is provided with a conical lower surface adapted to be readily applied to the mouth end of a receptacle as a bottle B.

In use of the device, the operator simply applies the cushion member 20 to the bottle to be charged and then presses down upon the handle bar 11, which causes a downward sliding movement of the shell 2 through the sleeve 5 which is supported by the yielding member 20 bearing on the bottle. The downward movement of the sleeve results in the downward movement of the air pipe 15 and the removal of the valve disc 16 from the lower end of the sleeve 5. This allows the liquid from the supply tube 4 to flow readily down through the filling device into the bottle. As the liquid reaches a predetermined level in the bottle, release of pressure on the handle 11 permits the spring 7 to react and shift the valve 16 to its closing position, thus cutting off flow of liquid.

In the event that the operator fails to cut off the flow of liquid through the device, the liquid would tend to rise in the air pipe 15 and when the liquid reaches the valve ball 18, this would be floated up against its seat 12ª and cut off the flow of liquid. During the filling of the bottle the air would be free to pass the ball 12ª and escape through the vent tube 9.

From the above it will be seen that I have provided a simple, substantial, and practicable form of filling nozzle whereby a large number of receptacles to be filled can be rapidly charged, one after the other, by the mere shifting of the various receptacles. It will be seen that the cushion member 20 is not removed from the bottle mouth until after the valve 16 has closed since the spring 7 holds valve like member 20 in place while the pressure is being removed from the handle 11.

It will thus be seen that when the bottle filler is lifted, the milk trapped in the vent tube 15 between its lower end and the float valve 18 will flow downwardly into the bottle and fill the space occupied by the cushion member 20 on the end of the nozzle and the valve attached to the lower end of the air-pipe 15. The various elements are so proportioned that this milk will fill the bottle substantially to the brim and therefore eliminate the necessity of a subsequent operation to fill this small amount of milk into the bottle to give correct and full measure.

It will be noted that the part of the flange 14 which cooperates with the valve seat member 12 has a series of studs 20 with open spaces 21 therebetween as shown in Fig. 4. When the ball 18 is in its lower position as indicated in Figs. 2 and 3 the ball rests on the top of the studs, allowing an air space between the studs for the upward flow of air as indicated in Fig. 3. However, when the milk rises in the tube 15 the ball is floated up against the seat 12ª as shown in Fig. 4.

Various modifications and changes may be resorted to within the spirit of the invention as claimed.

What is claimed is:

1. A bottle filler comprising in combination a tubular shell having a lateral branch adapted to be fitted to a source of supply, a nozzle slidably mounted on the lower end of the shell, a compression spring between the nozzle and the shell, a vent tube extending upwardly from the top of the shell, a handle attached thereto, an air vent pipe extending through the shell and connected to the upper end thereof, the connection forming a top closure for the shell, a float valve on the upper end of the air vent pipe adapted to discharge into the air vent tube but prevent flowing of liquid therein.

2. A bottle filler comprising in combination a tubular shell, a lateral branch adapted to be fitted to a source of supply, a nozzle slidably mounted on the lower end of the shell, a compression spring between the nozzle and the shell, a vent pipe extending through the shell and the nozzle having a flange on its upper end, a bushing resting on the flange, a vent tube outside the bushing connected to the shell, a ball valve having a valve seat in the upper part of the bushing, a series of studs with spaces therebetween on the flange and a ball in the bushing adapted to rest on the studs and to float against the valve seat.

In testimony whereof I have signed my name to this specification.

FRANK CHARLES WOLF.